(12) United States Patent
Yang (10) Patent No.: US 9,604,688 B1
(45) Date of Patent: Mar. 28, 2017

(54) FOLDABLE BICYCLE

(71) Applicant: VAST MIND DESIGN CREATIVE LTD., Taipei (TW)

(72) Inventor: Kuan-Li Yang, Taipei (TW)

(73) Assignee: VAST MIND DESIGN CREATIVE LTD., Taipei (TW)

( * ) Notice: Subject to any disclaimer, the term of this patent is extended or adjusted under 35 U.S.C. 154(b) by 0 days.

(21) Appl. No.: 15/362,344

(22) Filed: Nov. 28, 2016

(30) Foreign Application Priority Data

Nov. 30, 2015 (TW) .............................. 104140011 A (51) Int. Cl.
| | | |
|---|---|---|
| *B62K 15/00* | (2006.01) | |
| *B62K 3/10* | (2006.01) | |
| *B62K 19/30* | (2006.01) | |
| *B62K 21/22* | (2006.01) | |
| *B62K 19/18* | (2006.01) | |
| *B62J 1/04* | (2006.01) | |

(52) U.S. Cl.
CPC ............... *B62K 15/008* (2013.01); *B62J 1/04* (2013.01); *B62K 3/10* (2013.01); *B62K 19/18* (2013.01); *B62K 19/30* (2013.01); *B62K 21/22* (2013.01); *B62K 2015/005* (2013.01)

(58) Field of Classification Search
CPC .................... B62K 15/008; B62K 2015/005
USPC ........................................................ 280/287
See application file for complete search history.

(56) References Cited

U.S. PATENT DOCUMENTS

| | | | |
|---|---|---|---|
| 9,302,728 B1* | 4/2016 | Yang .................... | B62K 15/006 |
| 2013/0087989 A1* | 4/2013 | Beistegui Chirapozu | |
| | | | B62K 15/006 |
| | | | 280/287 |
| 2015/0210340 A1* | 7/2015 | Wang ................... | B62K 15/006 |
| | | | 280/278 |
| 2016/0144925 A1* | 5/2016 | Wang .................... | B62K 21/16 |
| | | | 280/261 |

* cited by examiner

*Primary Examiner* — Tony Winner
(74) *Attorney, Agent, or Firm* — Rabin & Berdo, P.C.

(57) ABSTRACT

A foldable bicycle includes a main frame, a front frame, a swingable middle frame, and a rear strut. The main frame includes a front casing, a middle pivoting member, and a rear pivoting member. The front frame is inserted into the front casing. The swingable middle frame includes an upper section, a middle section pivotally connected with the middle pivoting member, and a lower section including a guiding groove. The guiding groove includes first and second groove ends. The distance between the first groove end and the middle pivoting member is greater than that between the second groove end and the middle pivoting member. The rear strut includes a first end pivotally connected to the rear pivoting member and a second end connected to a slider. The slider is slidably received in the guiding groove and capable of being selectively moved between the first and second groove ends.

16 Claims, 11 Drawing Sheets

FOLDABLE BICYCLE

CROSS-REFERENCE TO RELATED APPLICATION

This non-provisional application claims priority under 35 U.S.C. §119(a) to Patent Application No. 104140011 in Taiwan, R.O.C. on Nov. 30, 2015, the entire contents of which are hereby incorporated by reference.

BACKGROUND

Technical Field

The instant disclosure relates to a bicycle, in particular, to a foldable bicycle.

Related Art

Foldable bicycles are developed to reduce the volumes of bicycles, and make the storage and carrying of bicycles more conveniently. In addition, a user may carry the foldable bicycle to take different kinds of transportations (e.g., vehicles, trains, boats, or airplanes). Therefore, foldable bicycles are popular in commuting and travelling.

SUMMARY

In general, the conventional foldable bicycle has a pivoting portion on the middle of the bicycle frame, so that car bodies at two sides of the pivoting portion can be folded toward each other and the front wheel and the rear wheel can be stacked. However, the foldable bicycle does not have a great reduction in volume after being folded. Furthermore, the folded conventional foldable bicycle cannot be carried conveniently. Hence, how to have the foldable bicycle to be folded in a rapid and convenient manner, and how to improve the portability of the foldable bicycle are issues to be improved.

In view of this, in one embodiment, a foldable bicycle is provided. The foldable bicycle comprises a main frame, a front frame, a swingable middle frame, and a rear strut. The main frame comprises a front casing, a middle pivoting member, and a rear pivoting member. The rear pivoting member is pivotally connected with a rear wheel. The front frame comprises a bottom portion pivotally connected with a front wheel. The front frame is inserted into the front casing. The swingable middle frame comprises an upper section, a middle section, and a lower section. The middle section is pivotally connected with the middle pivoting member. The lower section comprises a guiding groove. The guiding groove comprises a first groove end and a second groove end. A distance between the first groove end and the middle pivoting member is greater than a distance between the second groove end and the middle pivoting member. The rear strut comprises a first end and a second end. The first end is pivotally connected with the rear pivoting member and is swingable relative to the main frame. The second end is connected to a slider. The slider is received in the guiding groove so as to be selectively moved between the first groove end and the second groove end. Wherein, the swingable middle frame is selectively swung between a retracted position and a deployed position by taking the middle pivoting member as a rotation center. The deployed position is a position in which the slider is slidably moved to the first groove end, and the retracted position is a position in which the slider is slidably moved to the second groove end.

In one embodiment, a rotation shaft is pivotally connected with the slider, and a chain wheel is further assembled to the rotation shaft coaxially.

In one embodiment, the front casing of the main frame is pivotally connected with one end of the main frame, so that the front frame is swingable relative to the main frame.

In one embodiment, at least two rear auxiliary wheels are further assembled on the main frame, and the rear auxiliary wheels are respectively located at two sides of the rear wheel.

In one embodiment, a rear supporting frame is further assembled on the main frame.

In one embodiment, the foldable bicycle further comprises a front handlebar fixedly assembled on the front frame or the front casing.

In one embodiment, the rear pivoting member is a wheel shaft of the rear wheel.

In one embodiment, the lower section of the swingable middle frame comprises two plated members arranged parallel with each other. The guiding groove is defined through the plated members, and the rear strut is passing through a space between the plated members.

In one embodiment, the main frame comprises two main bars arranged parallel with each other. The front frame and the swingable middle frame are respectively passing through a space between the main bars.

In one embodiment, the foldable bicycle further comprises a handlebar post, a bendable structure, and a handlebar positioning structure. The bendable structure is connected between the handlebar post and the front frame, and the handlebar positioning structure positions the handlebar post at a folded position.

In one embodiment, the handlebar positioning structure comprises at least one positioning member disposed on the main frame or the handlebar post.

In one embodiment, the foldable bicycle further comprises a middle frame positioning structure positioning the slider at the first groove end or the second groove end.

In one embodiment, the middle frame positioning structure comprises a positioning pin and a positioning hole. The positioning pin is retractably disposed on the swingable middle frame. The positioning hole is on the slider. The positioning pin is selectively inserted into or detached from the positioning hole.

In one embodiment, the foldable bicycle further comprises a front frame positioning structure. The front frame positioning structure positions the front frame at a stored position in which the front frame is near the main frame or positions the front frame at an extended position in which the front frame is distant from the main frame.

In one embodiment, the front frame positioning structure comprises an engaging groove, an elastic member, and an engaging member connected to the elastic member. The engaging groove and the elastic member are disposed on the front casing. The engaging member is connected to the main frame and selectively engaged with or detached from the engaging groove.

Accordingly, in one embodiment, the swingable middle frame is swingable relative to the main frame, and the rear strut is slidably received in the guiding groove of the swingable middle frame by the slider. Hence, when the swingable middle frame is swung and folded toward the main frame, the rear strut can be driven to be folded toward the main frame as well. Therefore, the foldable bicycle can be folded rapidly, and the front wheel and the rear wheel of the folded foldable bicycle do not stack with each other, so that the occupied volume of the foldable bicycle can be efficiently reduced.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
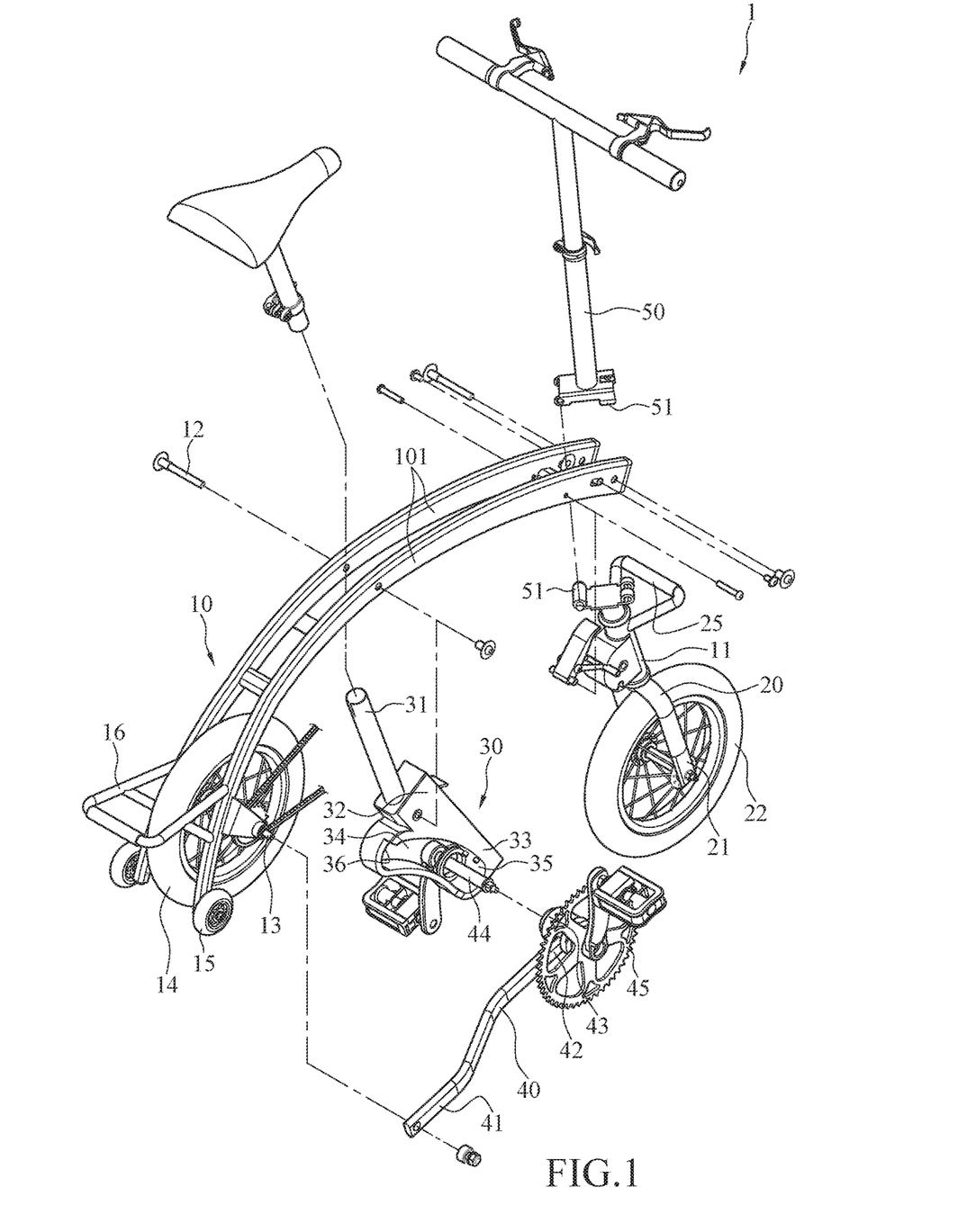
FIG. 1 illustrates an exploded view of an exemplary embodiment of a foldable bicycle of the instant disclosure.
Figure 2:
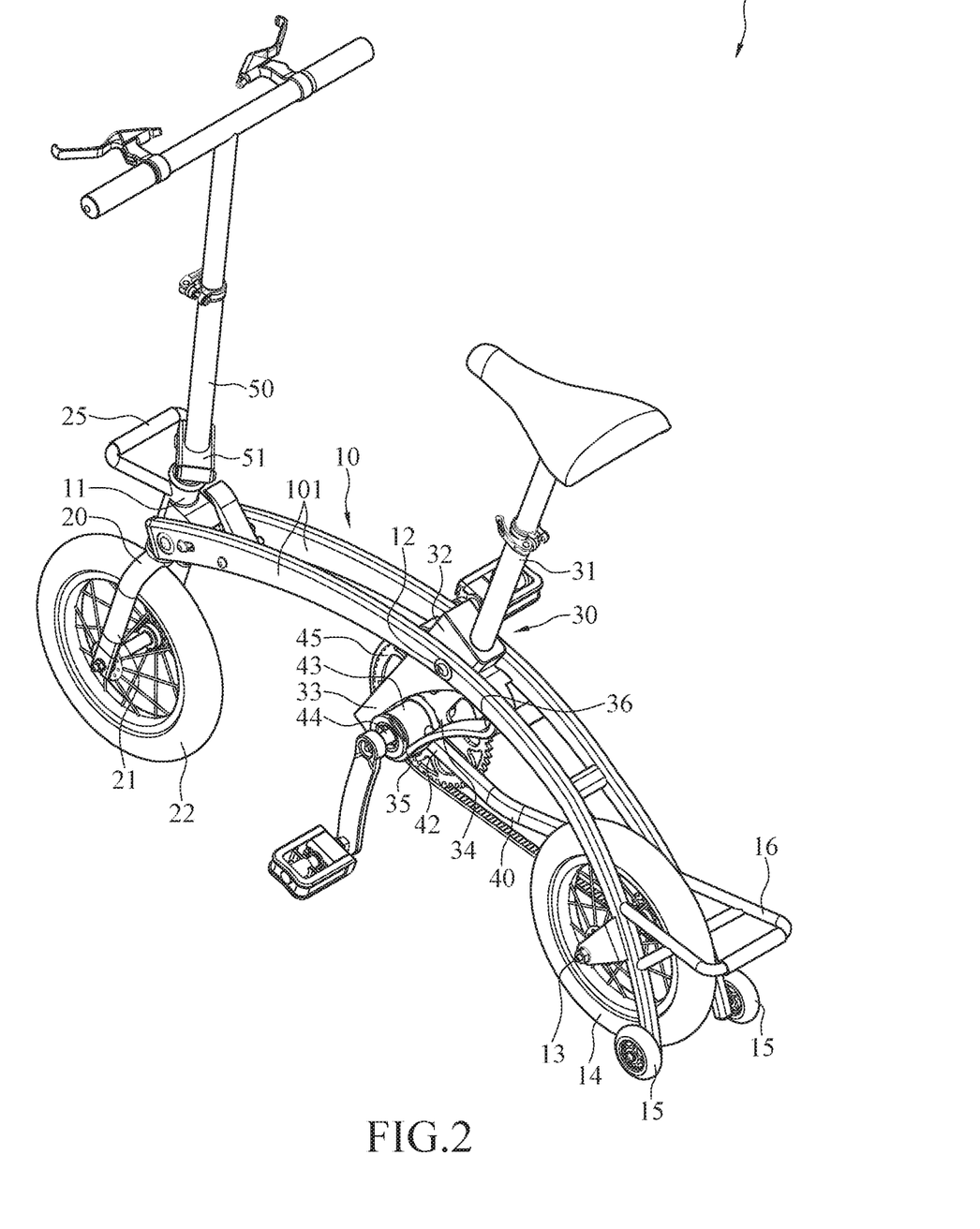
FIG. 2 illustrates a perspective view of the foldable bicycle of FIG. 1.

FIGS. 1 and 2 respectively illustrate an exploded view and a perspective view of an exemplary embodiment of a foldable bicycle of the instant disclosure. As shown in FIGS. 1 and 2, in one embodiment, the foldable bicycle 1 comprises a main frame 10, a front frame 20, a swingable middle frame 30, and a rear strut 40.

As shown in FIGS. 1 and 2, the main frame 10 comprises a front casing 11, a middle pivoting member 12, and a rear pivoting member 13. The rear pivoting member 13 is pivotally connected with a rear wheel 14. In one embodiment, the main frame 10 comprises two main bars 101 arranged parallel with each other. The two main bars 101 can be connected and positioned with each other by one or more spacers, so that the two main bars 101 are spaced apart.

As shown in FIGS. 1 and 2, the middle pivoting member 12 is located between the rear pivoting member 13 and the front casing 11. In one embodiment, the middle pivoting member 12 may be a fixed shaft or rotation shaft assembled on the main frame 10 or a shaft hole on the main frame 10. Similarly, the rear pivoting member 13 may be a fixed shaft or rotation shaft assembled on the main frame 10 or a shaft hole on the main frame 10, embodiments are not limited thereto.

Figure 4:
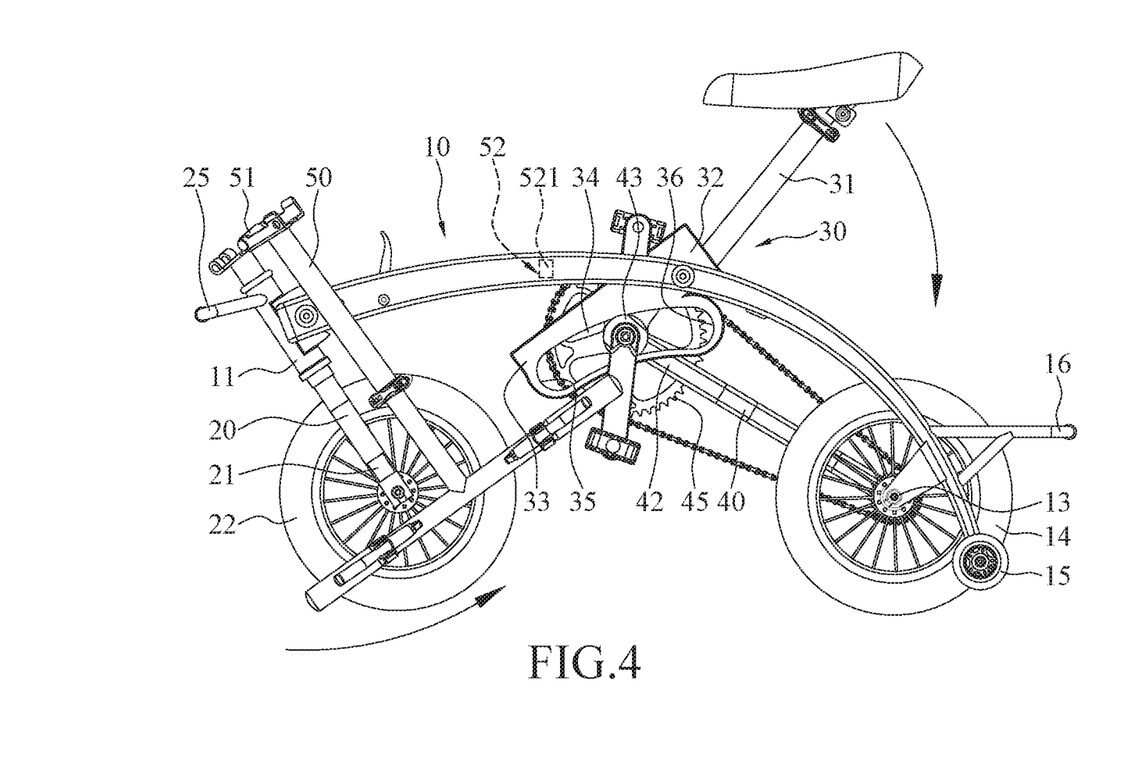
FIG. 4 illustrates a schematic folded view (1) of the foldable bicycle of FIG. 1.

As shown in FIGS. 1 and 2, the front frame 20 comprises a bottom portion 21 pivotally connected with a front wheel 22. The front frame 20 is inserted into the front casing 11 of the main frame 10. In one embodiment, the front casing 11 is a hollowed tube pivotally connected with the main frame 10, and the front casing 11 is passing through a space between the two main bars 101. For example, the front casing 11 may be pivotally connected with the main frame 10 via a fixed shaft so as to be swingable relative to the main frame 10. The front frame 20 is inserted into the front casing 11, thus, the front frame 20 can also be swingable relative to the main frame 10 to make the front wheel 22 near or away from the main frame 10. In one embodiment, the top portion of the front frame 20 is further connected to a handlebar post 50, and a bendable structure 51 is connected between the handlebar post 50 and the front frame 20, so that the handlebar post 50 can be folded toward the front frame 20 to be at a folded position (as shown in FIG. 4). In one embodiment, the bendable structure 51 may be a pivoting member (e.g., a rotation shaft or a shaft hole). Therefore, the handlebar post 50 and the front frame 20 are pivotally connected with each other, so that the handlebar post 50 can be bent relative to the front frame 20.

As shown in FIGS. 1 and 2, the swingable middle frame 30 comprises an upper section 31, a middle section 32, and a lower section 33. The middle section 32 is pivotally connected with the middle pivoting member 12 of the main frame 10. The lower section 33 comprises a guiding groove 34. The guiding groove 34 comprises a first groove end 35 and a second groove end 36. In one embodiment, the upper section 31 of the swingable middle frame 30 is a seat post, the lower section 33 of the swingable middle frame 30 is a block member, and the middle section 32 is a section between the upper section 31 and the lower section 33. The middle section 32 may have a shaft hole for pivotally connecting with the middle pivoting member 12. Therefore, the swingable middle frame 30 is swingable relative to the main frame 10 by taking the middle pivoting member 12 as a rotation center. In one embodiment, the swingable middle frame 30 may pass through the space between the two main bars 101 of the main frame 10, so that the swingable middle frame 30 is not stopped by the main frame 10 when the swingable middle frame 30 is swung relative to the main frame 10.

As shown in FIGS. 1 and 2, in one embodiment, the guiding groove 34 is an arced groove and defined through two sides of the lower section 33. In addition, a distance between the first groove end 35 and the middle pivoting member 12 is greater than a distance between the second groove end 36 and the middle pivoting member 12. In other words, the first groove end 35 is near an end of the lower section 33, while the second groove end 36 is near the middle pivoting member 12. In one embodiment, a distance between the first groove end 35 and the rear pivoting member 13 is greater than a distance between the second groove end 36 and the rear pivoting member 13, but embodiments are not limited thereto. Alternatively, the guiding groove 34 may be a groove having consecutive arced profiles or a groove with a curved profile.

As shown in FIGS. 1 and 2, the rear strut 40 comprises a first end 41 and a second end 42. The first end 41 is pivotally connected with the rear pivoting member 13 and is swingable relative to the main frame 10. The second end 42 is connected to a slider 43, and the slider 43 is slidably received in the guiding groove 34 to be selectively moved between the first groove end 35 and the second groove end 36. In one embodiment, the rear strut 40 is an elongated bar, and the rear pivoting member 13 is a wheel shaft of a rear wheel 14. Therefore, the rear wheel 14 and the first end 41 of the rear strut 40 are pivotally connected with the same rotation shaft, so that the rear strut 40 is swingable relative to the main frame 10.

In one embodiment, the rear pivoting member 13 may comprise fixed shafts or shaft holes at different positions, so that the rear wheel 14 and the first end 41 of the rear strut 40 are pivotally connected to different positions. In one embodiment, a rotation shaft 44 may be pivotally connected with the slider 43, and a chain wheel 45 is coaxially connected to the rotation shaft 44. A periphery of the chain wheel 45 is engaged with a chain, and two sides of the chain wheel 45 are assembled with pedals, so that a user can tread on the pedals to drive the rear wheel 14 to rotate. In one embodiment, the slider 43 may be provided as a member for rotation (i.e., in such embodiment, the rotation shaft 44 is omitted), but embodiments are not limited thereto.

Accordingly, the swingable middle frame 30 is selectively swung between a retracted position and a deployed position by taking the middle pivoting member 12 as a rotation center. The deployed position is a position in which the slider 43 is slidably moved to the first groove end 35, and the retracted position is a position in which the slider 43 is slidably moved to the second groove end 36. In other words, when the swingable middle frame 30 is swung relative to the main frame 10, the rear strut 40 can be driven to swing about the first end 41 to make the slider 43 slidably move in the guiding groove 34 as well.

Accordingly, the front frame 20, the swingable middle frame 30, and the rear strut 40 can be swung relative to the main frame 10, so that the foldable bicycle 1 can be folded rapidly. Such feature is described in following paragraphs.

Figure 3:
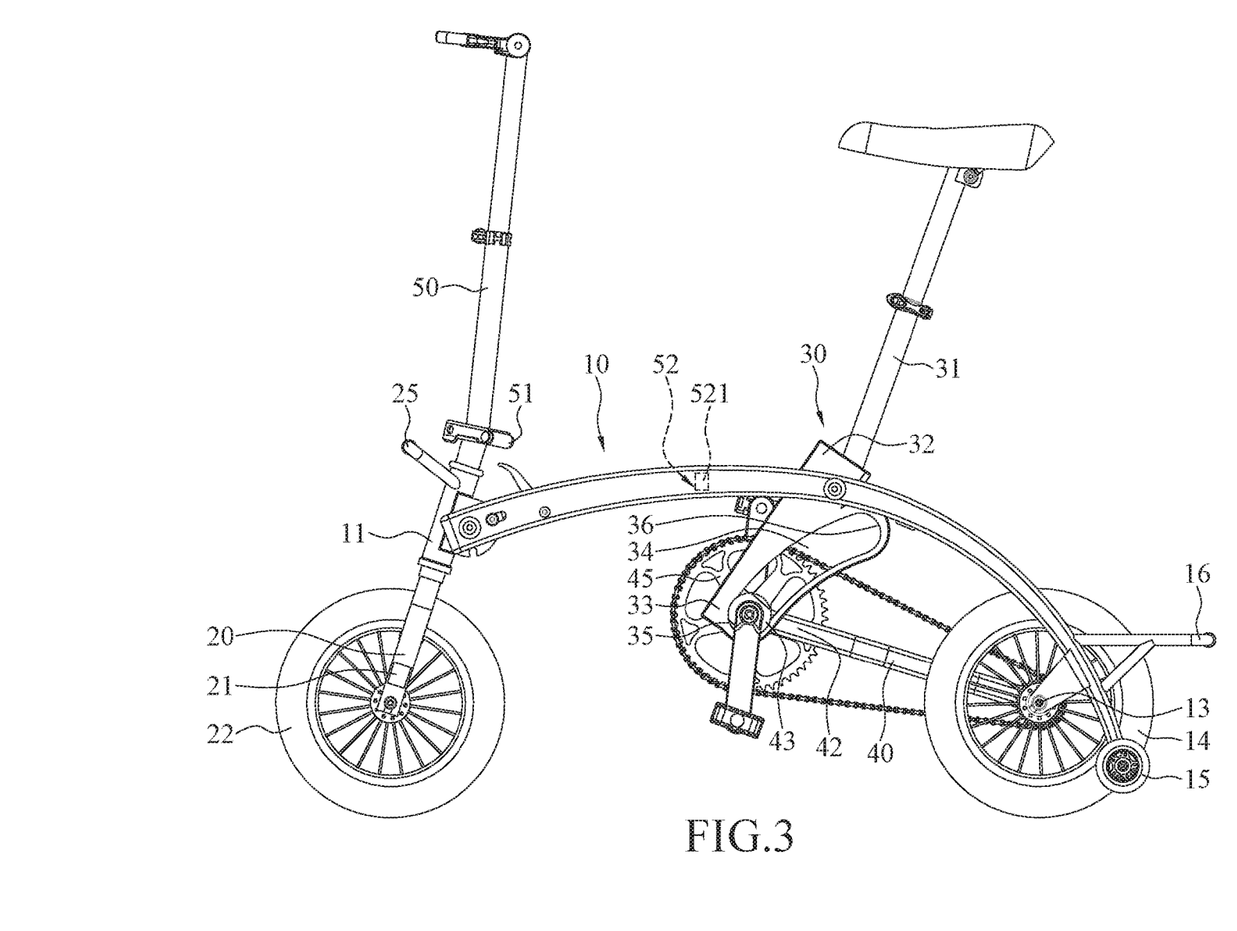
FIG. 3 illustrates a schematic deployed view of the foldable bicycle of FIG. 1.

As shown in FIG. 3, the foldable bicycle 1 is deployed and in a state that is capable of being ridden by a user. In such state, the main frame 10 is extending along a transversal direction, while the front frame 10 and the swingable middle frame 30 are extending along a vertical direction. Moreover, in FIG. 3, the swingable middle frame 30 is in the deployed position; that is, the slider 43 is slidably moved to the first groove end 35.

As shown in FIG. 4, when the user tends to fold the foldable bicycle 1, the user can swing the swingable middle frame 30 (in this embodiment, along a clockwise direction). Thus, the two ends of the swingable middle frame 30 will gradually come close to the main frame 10, and the guiding groove 34 guides the slider 43 to move upward. Furthermore, because the first end 41 of the rear strut 40 is pivotally connected with the rear pivoting member 13, the rotation center of the rear strut 40 is fixed. Hence, during the upward movement of the slider 43, the rear strut 40 swings along a clockwise direction by taking the first end 41 as the rotation center, so that the slider 43 is moved toward the second groove end 36 gradually. Moreover, the user can bend the handlebar post 50 relative to the front frame 20 and swings the front frame 20 relative to the main frame 10 (in this embodiment, along a counterclockwise direction), so that the front frame 20, the front wheel 22, and the handlebar post 50 will gradually come close to the main frame 10.

Figure 5:
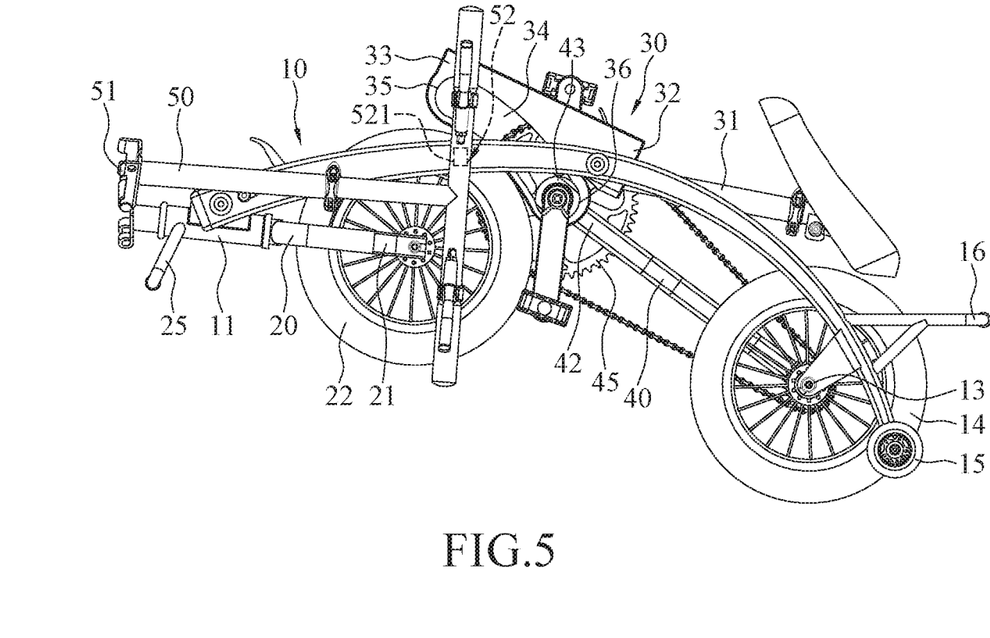
FIG. 5 illustrates a schematic folded view (2) of the foldable bicycle of FIG. 1.

As shown in FIG. 5, the foldable bicycle 1 is folded. As shown, the swingable middle frame 30 is swung to the retracted position; that is, the slider 43 is slidably moved to the second groove end 36, so that the swingable middle frame 30 and the main frame 10 are both extending along the transversal direction, and the chain wheel 45 and the rear strut 40 are further come closer to the main frame 10. Moreover, after the front frame 20 and the handlebar post 50 are come close to the main frame 10, the front frame 20 and the handlebar post 50 are also extending along the transversal direction. Furthermore, because the chain wheel 45 is pushed to be close to the main frame 10, the front wheel 22 can be moved to a position originally occupied by the chain wheel 45 and the lower section 33 of the swingable middle frame 30. Hence, the front wheel 22 can further come closer to the main frame 10, so that the width of the folded foldable bicycle can be reduced greatly. In addition, the front wheel 22 can further pass through the space between the two main bars 101 and lean against the lower section 33 of the swingable middle frame 30, so that the foldable bicycle 1 can be folded securely.

Accordingly, a user can deploy or retract the foldable bicycle 1 by swinging the front frame 20 and the swingable middle frame 30 relative to the main frame 10. In addition, the front wheel 22 and the rear wheel 14 of the folded foldable bicycle 1 do not stack with each other, so that the occupied volume of the foldable bicycle 1 can be efficiently reduced.

In one embodiment, the foldable bicycle 1 further comprises a handlebar positioning structure 52 for positioning the handlebar post 50 at a folded position. The folded position is a position in which the handlebar post 50 is bent toward the front frame 20 and stacked on the front frame 20 (as shown in FIGS. 4 and 5).

In one embodiment, the handlebar positioning structure 52 comprises at least one positioning member 21 disposed on the main frame 10 or the handlebar post 50. Please refer to FIGS. 4 and 5, in which embodiment, the positioning member 521 is a magnetic member disposed on the main frame 10. When the foldable bicycle 1 is folded (as shown in FIG. 5), the handlebar post 50 can be attracted by the positioning member 521 and positioned by the positioning member 521. Moreover, because the front wheel 22 is leaned against the lower section 33 of the swingable middle frame 30, the swingable middle frame 30 can be positioned as well. In one embodiment, the positioning member 521 may be an engaging member or an engaging groove, so that the handlebar post 50 can be positioned with the main frame 10 by engaging. Alternatively, the handlebar positioning structure 52 may comprise a plurality of positioning members 521 (e.g. engaging members or magnetic members), and the positioning members 521 are respectively disposed on the handlebar post 50 and the main frame 10, but embodiments are not limited thereto.

In one embodiment, the foldable bicycle 1 further comprises a middle frame positioning structure 60 positioning the slider 43 at the first groove end 35 or at the second groove end 36. Therefore, the slider 43 can be positioned when the swingable middle frame 30 is at the retracted position or the deployed position.

Figure 6:
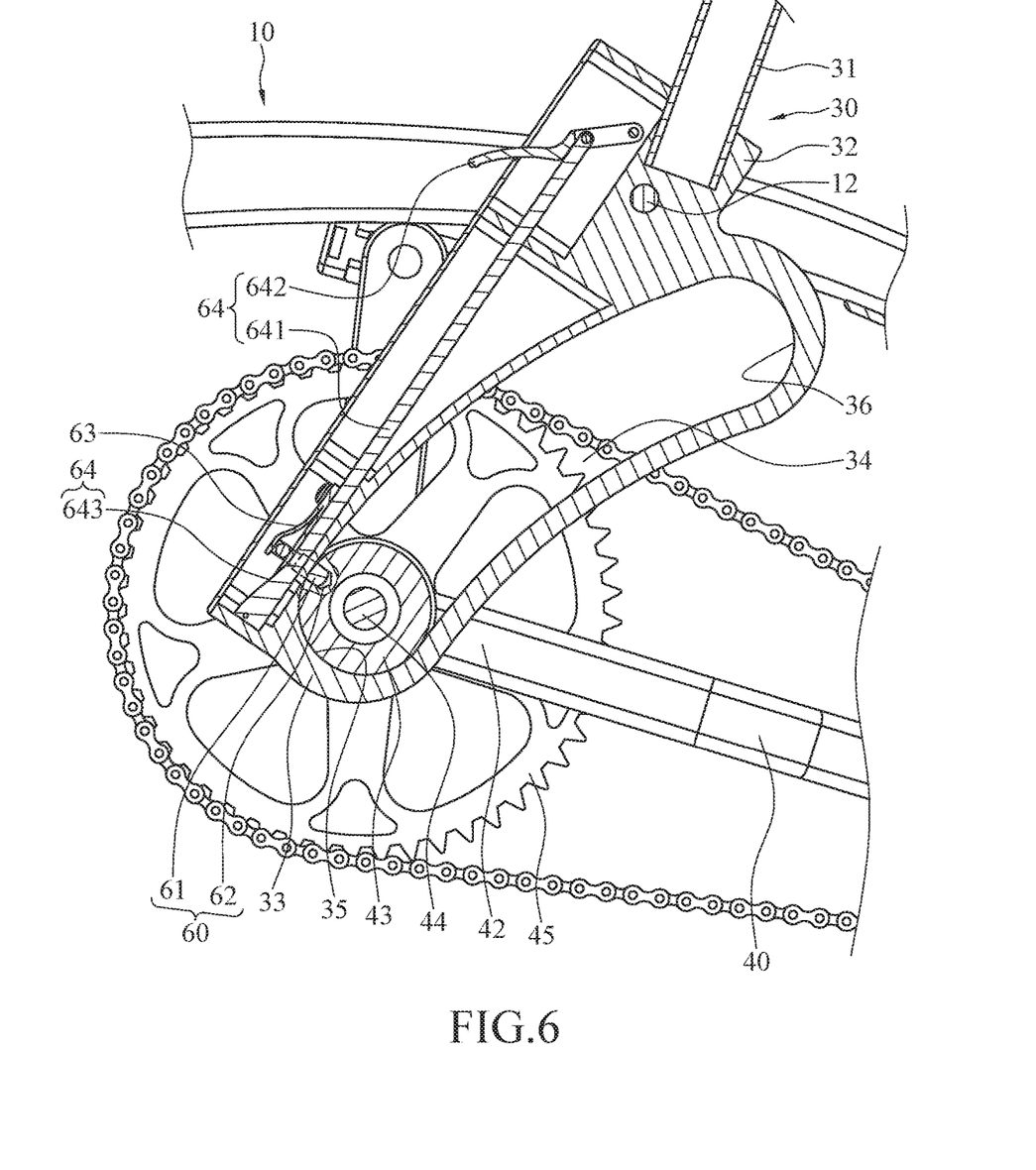
FIG. 6 illustrates a partial sectional view of the foldable bicycle of FIG. 1.

As shown in FIG. 6, in one embodiment, the middle frame positioning structure 60 comprises a positioning pin 61 and a positioning hole 62. The positioning pin 61 is retractably disposed on the swingable middle frame 30, and the positioning hole 62 is on the slider 43. The positioning pin 61 can be inserted into the positioning hole 62 for positioning the swingable middle frame 30. Alternatively, the positioning pin 61 can be detached from the positioning hole 62 to allow the swingable middle frame 30 to be swung freely. In this embodiment, the middle frame positioning structure 60 further comprises an elastic piece 63 and a releasable structure 64. The elastic piece 63 is elastically pushed against the positioning pin 61, so that the positioning pin 61 is inserted into the positioning hole 62. The releasable structure 64 comprises a driving member 641 and an operating member 642. The operating member 642 is pivotally connected with the swingable middle frame 30. The driving member 641 is a bar member and pivotally connected with the operating member 642. In addition, the driving member 641 further comprises a driving inclined surface 643. When a user operates the operating member 642 to swing relative to the swingable middle frame 30, the driving member 641 is driven by the operating member 642 and moved linearly. Hence, the driving inclined surface 643 drives the positioning pin 61 to push against the elastic piece 63 and detach from the positioning hole 62, so that the swingable middle frame 30 can be swung freely.

In one embodiment, the foldable bicycle 1 further comprises a front frame positioning structure 70. The front frame positioning structure 70 positions the front frame 20 at a stored position in which the front frame 20 is near the main frame 10 (as shown in FIG. 5), the front frame positioning structure 70 positions the front frame 20 at an extended position in which the front frame 20 is distant from the main frame 10 (as shown in FIG. 3), or, the front frame positioning structure 70 selectively positions the front frame 20 at the stored position or at the extended position.

Figure 7:
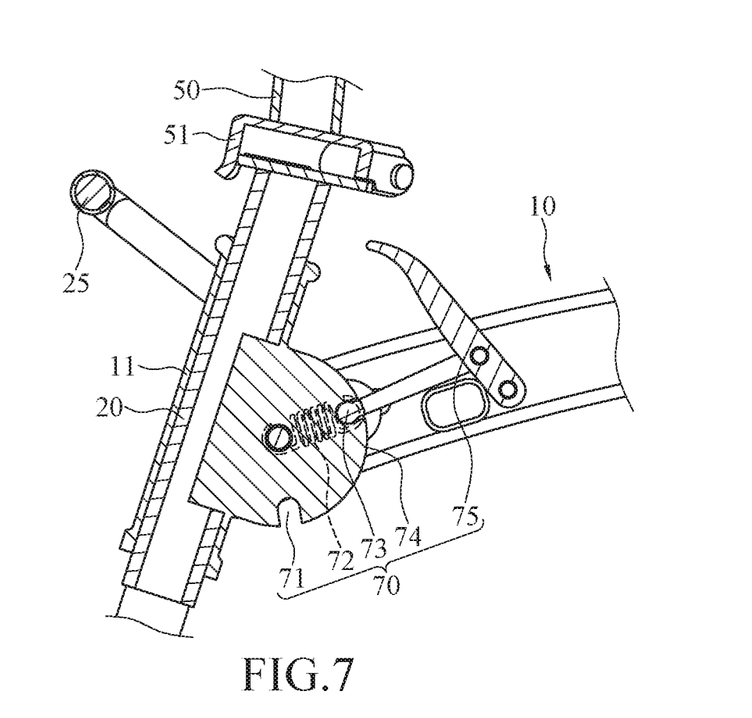
FIG. 7 illustrates another partial sectional view of the foldable bicycle of FIG. 1.
Figure 8:
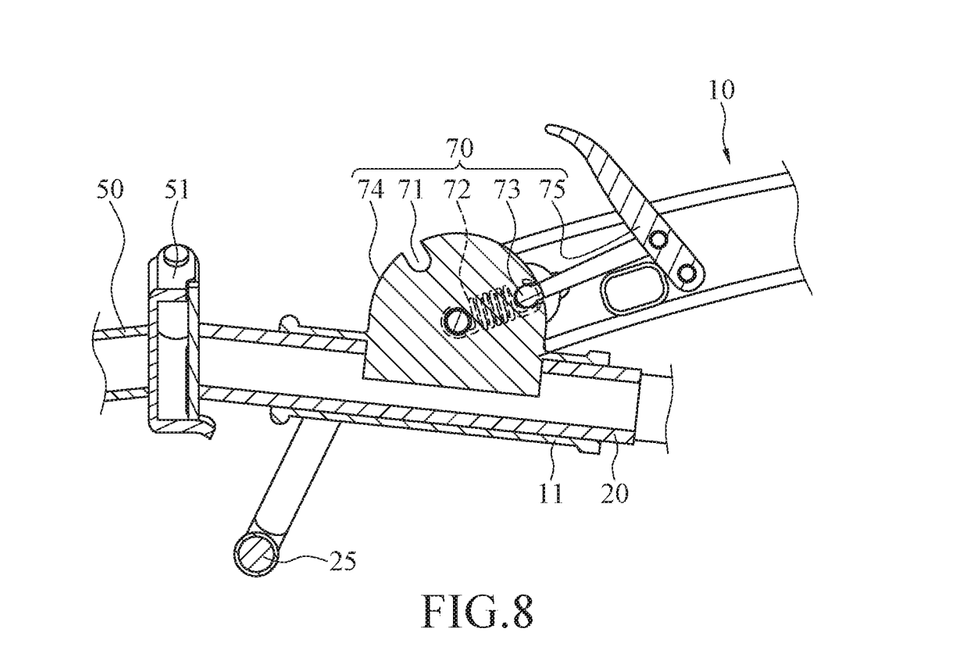
FIG. 8 illustrates a schematic operational view of FIG. 7.

In one embodiment, the front frame positioning structure 70 comprises at least one engaging groove 71, an elastic member 72, and an engaging member 73 connected to the elastic member 72. The engaging groove 71 and the elastic member 72 are disposed on the front casing 11, and the engaging member 73 is connected to the main fame 10 and selectively engaged with or detached from the engaging groove 71. As shown in FIGS. 7 and 8, in this embodiment, the front casing 11 has a curved guiding surface 74, the front frame positioning structure 70 comprises two engaging grooves 71, and the two engaging grooves 71 are respectively at two ends of the curved guiding surface 74. The engaging member 73 (in this embodiment, a pin) is inserted into one of the engaging grooves 71, and one of two ends of the elastic member 72 (in this embodiment, a spring) is fixedly connected to the front casing 11, and the other end of the elastic member 72 is fixedly connected to the engaging member 73. Therefore, the engaging member 73 can be engaged with the engaging groove 71 continuously by the elastic pulling force of the elastic member 72. The front frame positioning structure 70 may comprise a releasable member 75 pivotally connected with the main frame 10, and the engaging member 73 is pivotally connected with the releasable member 75. Accordingly, when a user operates the releasable member 75 to swing relative to the main frame 10, the engaging member 73 is driven and detached from the engaging groove 71, so that the front frame 20 can be swung freely. When the front frame 20 is at the extended position (as shown in FIG. 7), the engaging member 73 is engaged with one of the engaging grooves 71; while when the front frame 20 is at the stored position (as shown in FIG. 8), the engaging member 73 is engaged with the other engaging groove 71.

Figure 9:
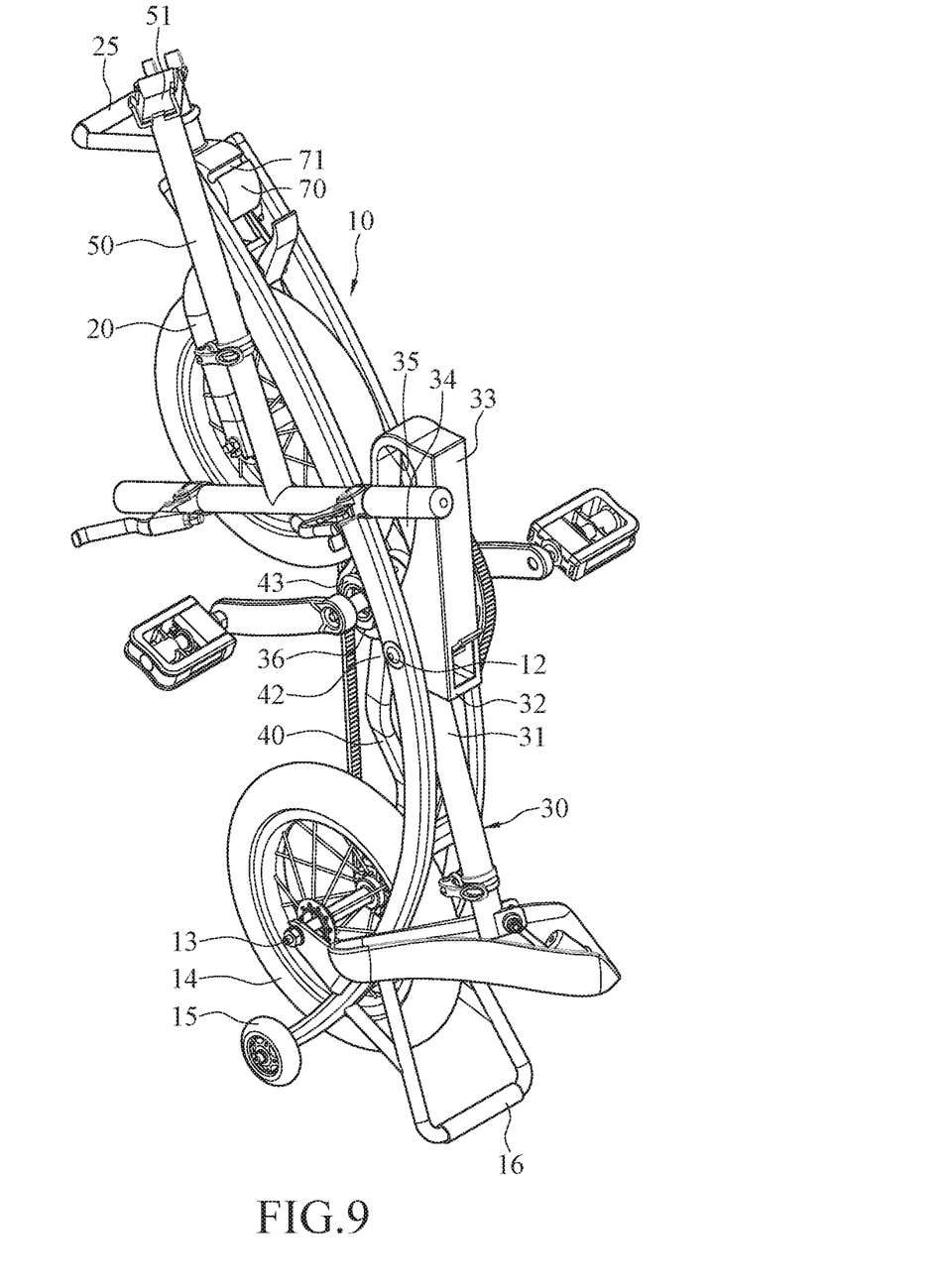
FIG. 9 illustrates a folded perspective view of the foldable bicycle of FIG. 1.

Further, as shown in FIG. 2, in one embodiment, two rear auxiliary wheels 15 are further assembled on the main frame 10, and the rear auxiliary wheels 15 are respectively located at two sides of the rear wheel 14. In another embodiment, the main frame 10 may be assembled with two or more rear auxiliary wheels 15, but embodiments are not limited thereto. Furthermore, a rear supporting frame 16 is further assembled on the main frame 10. In this embodiment, the rear supporting frame 16 is extending backward. As shown in FIG. 9, after the foldable bicycle 1 is folded, the foldable bicycle 1 can stand on the ground surface by the two rear auxiliary wheels 15 and the rear supporting frame 16. Furthermore, when the foldable bicycle 1 is deployed and in a state that is capable of being ridden by a user (as shown in FIG. 2), the rear supporting frame 16 can be provided for placing articles.

Figure 10:
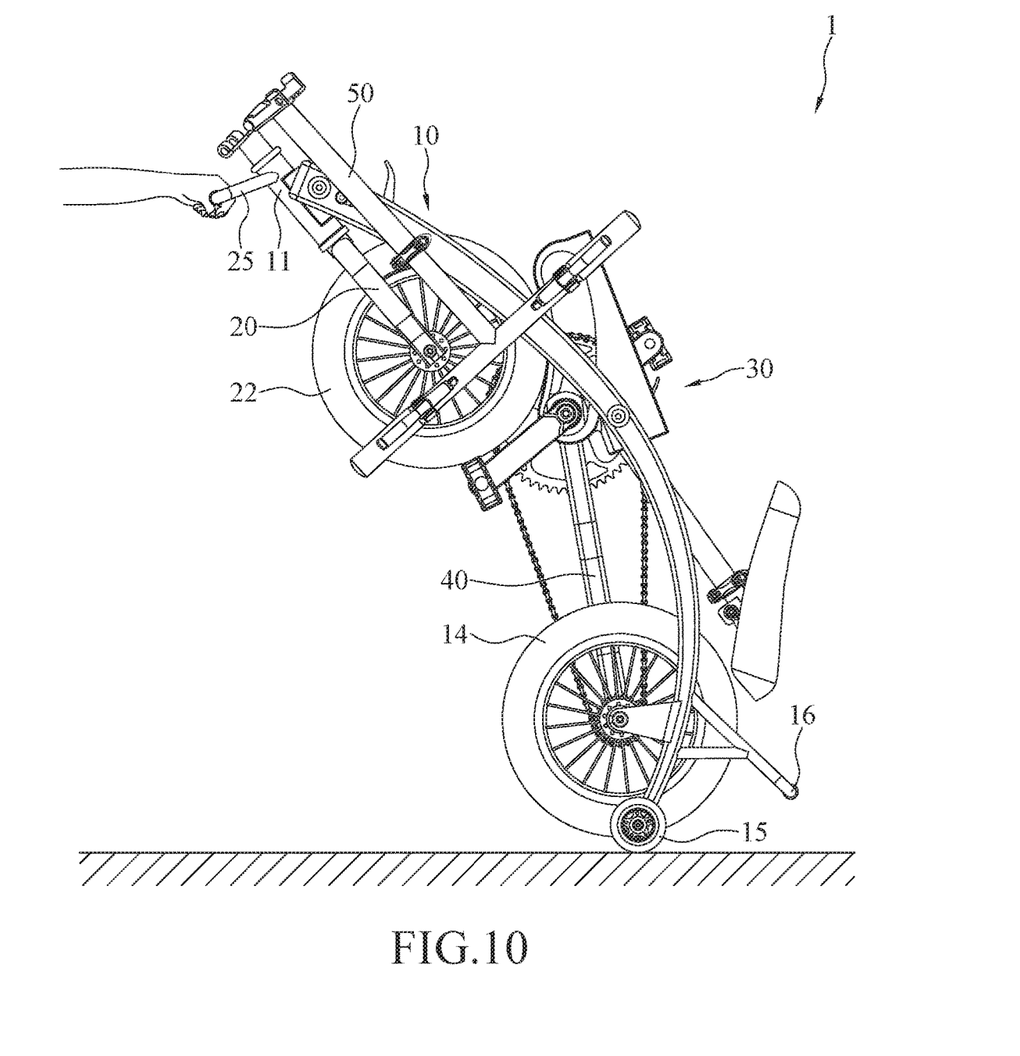
FIG. 10 illustrates a schematic operational view showing the foldable bicycle is capable of being drawn on ground.

As above, as shown in FIG. 10, when a user tends to carry the foldable bicycle 1, the user can allow the foldable bicycle 1 to be in a tilt state in which only the two rear auxiliary wheels 15 are in contact with the ground surface. Hence, the user can drag the foldable bicycle 1 to move. In one embodiment, the foldable bicycle 1 further comprises a front handlebar 25 fixedly assembled (e.g., soldered or installed) on the front casing 11, so that the user can hold the front handlebar 25 to drag the foldable bicycle 1 conveniently. In one embodiment, the front handlebar 25 may be fixedly assembled on the front frame 20, the main frame 10, or the handlebar post 50, but embodiments are not limited thereto.

Figure 11:
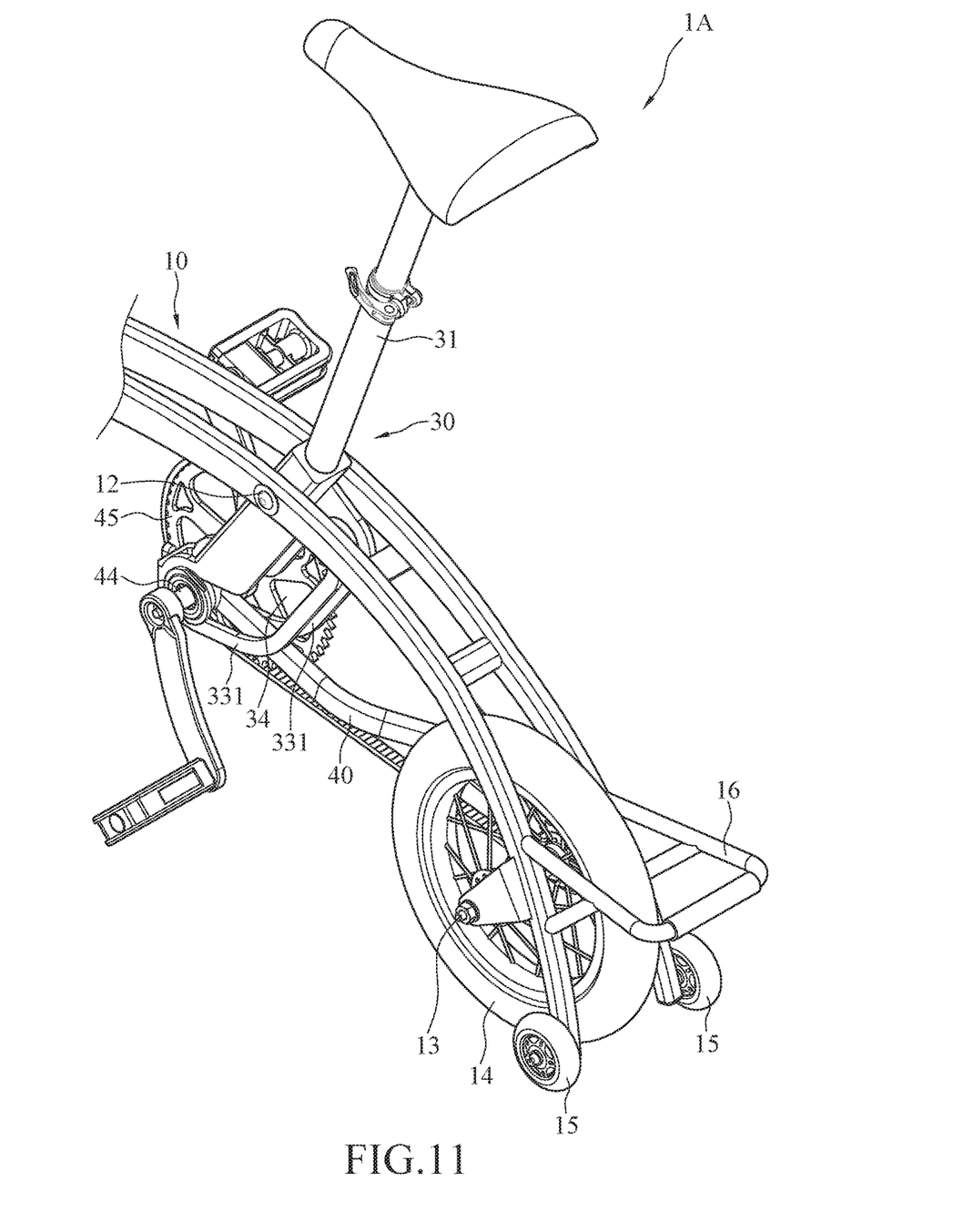
FIG. 11 illustrates a perspective view of another embodiment of a foldable bicycle of the instant disclosure.

As shown in FIG. 11, a perspective view of another embodiment of the foldable bicycle 1A is illustrated. In this embodiment, the lower section 33 of the swingable middle frame 30 of the foldable bicycle 1A comprises two plated members 331 arranged parallel with each other. The guiding groove 34 is defined through the plated members 331, and the rear strut 40 is passing through a space between the plated members 331. In this embodiment, the guiding groove 34 is not formed by removing materials of a solid block; instead, the two plated members 331 are cut to form grooves followed by fixing the two plated members 331 on two sides of a block. Hence, the material used in the foldable bicycle 1A can be reduced as compared with that in the foldable bicycle 1. Furthermore, in the embodiment shown in FIG. 2, the shape of the guiding groove 34 is arced; while in this embodiment, the shape of the guiding groove 34 is a reverse L profile.

Figure 12:
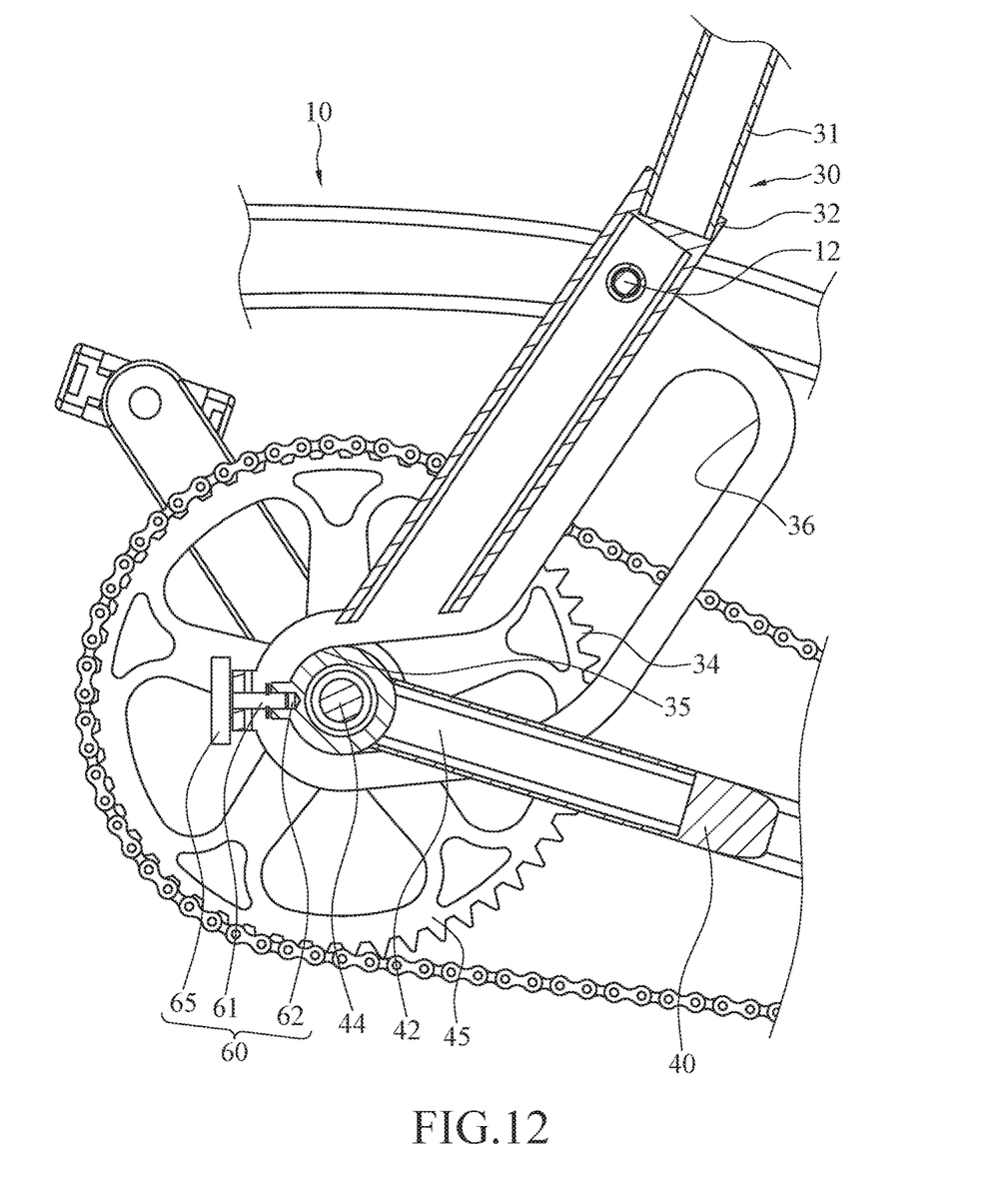
FIG. 12 illustrates a partial enlarged sectional view of the foldable bicycle of FIG. 11.

In one embodiment, as shown in FIG. 12, another embodiment of the middle frame positioning structure 60 is provided. In this embodiment, the middle frame positioning structure 60 comprises a handlebar 65 exposed out of the swingable middle frame 30 and connected to the positioning pin 61. Accordingly, the handlebar 65 can be pulled or pushed to move the positioning pin 61 retractably, so that the positioning pin 61 can be engaged with or detached from the positioning hole 62.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A foldable bicycle, comprising:
   a main frame, comprising a front casing, a middle pivoting member, and a rear pivoting member, wherein the rear pivoting member is pivotally connected with a rear wheel;
   a front frame, comprising a bottom portion pivotally connected with a front wheel, wherein the front frame is inserted into the front casing;
   a swingable middle frame comprising an upper section, a middle section, and a lower section, wherein the middle section is pivotally connected with the middle pivoting member, the lower section comprises a guiding groove, the guiding groove comprises a first groove end and a second groove end, a distance between the first groove end and the middle pivoting member is greater than a distance between the second groove end and the middle pivoting member; and
   a rear strut comprising a first end and a second end, wherein the first end is pivotally connected with the rear pivoting member and is swingable relative to the main frame, the second end is connected to a slider, the slider is slidably received in the guiding groove so as to be selectively moved between the first groove end and the second groove end;
   wherein, the swingable middle frame is selectively swung between a retracted position and a deployed position by taking the middle pivoting member as a rotation center, the deployed position is a position in which the slider is slidably moved to the first groove end, and the retracted position is a position in which the slider is slidably moved to the second groove end.

2. The foldable bicycle according to claim 1, wherein a rotation shaft is pivotally connected with the slider, and a chain wheel is further connected to the rotation shaft coaxially.

3. The foldable bicycle according to claim 1, wherein the front casing of the main frame is pivotally connected with one end of the main frame, so that the front frame is swingable relative to the main frame.

4. The foldable bicycle according to claim 3, further comprising a front frame positioning structure, the front frame positioning structure positions the front frame at a stored position in which the front frame is near the main frame, the front frame positioning structure positions the front frame at an extended position in which the front frame is distant from the main frame, or the front frame positioning structure selectively positions the front frame at the stored position or at the extended position.

5. The foldable bicycle according to claim 4, wherein the front frame positioning structure comprises at least one engaging groove, an elastic member, and an engaging member connected to the elastic member, wherein the engaging groove and the elastic member are disposed on the front casing, the engaging member is connected to the main frame and selectively engaged with or detached from the engaging groove.

6. The foldable bicycle according to claim 1, wherein a rear supporting frame is further assembled on the main frame.

7. The foldable bicycle according to claim 1, further comprising a front handlebar fixedly assembled on the front frame or the front casing.

8. The foldable bicycle according to claim 1, wherein the rear pivoting member is a wheel shaft of the rear wheel.

9. The foldable bicycle according to claim 1, wherein the lower section of the swingable middle frame comprises two plated members arranged parallel with each other, the guiding groove is defined through the plated members, and the rear strut is passing through a space between the plated members.

10. The foldable bicycle according to claim 1, wherein the main frame comprises two main bars arranged parallel with each other, the front frame and the swingable middle frame are respectively passing through a space between the main bars.

11. The foldable bicycle according to claim 1, further comprising a handlebar post, a bendable structure, and a handlebar positioning structure, wherein the bendable structure is connected between the handlebar post and the front frame, and the handlebar positioning structure positions the handlebar post at a folded position.

12. The foldable bicycle according to claim 11, wherein the handlebar positioning structure comprises at least one positioning member disposed on the main frame or the handlebar post.

13. The foldable bicycle according to claim 1, further comprising a middle frame positioning structure positioning the slider at the first groove end or the second groove end.

14. The foldable bicycle according to claim 13, wherein the middle frame positioning structure comprises a positioning pin and a positioning hole, the positioning pin is retractably disposed on the swingable middle frame, the positioning hole is on the slider, the positioning pin is selectively inserted into or detached from the positioning hole.

15. The foldable bicycle according to claim 1, wherein at least two rear auxiliary wheels are further assembled on the main frame, and the rear auxiliary wheels are respectively located at two sides of the rear wheel.

16. The foldable bicycle according to claim 15, wherein a rear supporting frame is further assembled on the main frame.

* * * * *